(12) United States Patent
Kim et al.

(10) Patent No.: US 11,424,483 B2
(45) Date of Patent: Aug. 23, 2022

(54) ELECTROLYTE FOR LITHIUM SECONDARY BATTERY, AND LITHIUM SECONDARY BATTERY COMPRISING SAME

(71) Applicants: SAMSUNG SDI CO., LTD., Yongin-si (KR); SOGANG UNIVERSITY RESEARCH FOUNDATION, Seoul (KR)

(72) Inventors: Aeran Kim, Yongin-si (KR); Bongjin Moon, Goyang-si (KR); Myungjun Park, Seoul (KR); Woo Cheol Shin, Yongin-si (KR); Jeongmin Shin, Yongin-si (KR); Kayoung Jeon, Seoul (KR); Hyunbong Choi, Yongin-si (KR)

(73) Assignees: Samsung SDI Co., Ltd., Yongin-si (KR); Sogang University Research Foundation, Seoul (KR)

( * ) Notice: Subject to any disclaimer, the term of this patent is extended or adjusted under 35 U.S.C. 154(b) by 250 days.

(21) Appl. No.: 16/607,572

(22) PCT Filed: Jan. 17, 2018

(86) PCT No.: PCT/KR2018/000769
§ 371 (c)(1),
(2) Date: Oct. 23, 2019

(87) PCT Pub. No.: WO2018/199430
PCT Pub. Date: Nov. 1, 2018

(65) Prior Publication Data
US 2020/0136184 A1    Apr. 30, 2020

(30) Foreign Application Priority Data
Apr. 28, 2017 (KR) .................. 10-2017-0055621

(51) Int. Cl.
H01M 10/0567 (2010.01)
H01M 4/505 (2010.01)
(Continued)

(52) U.S. Cl.
CPC ....... $H01M\ 10/0567$ (2013.01); $H01M\ 4/505$ (2013.01); $H01M\ 4/525$ (2013.01);
(Continued)

(58) Field of Classification Search
CPC ......... H01M 10/0567; H01M 10/0525; H01M 10/0569; H01M 10/4235
See application file for complete search history.

(56) References Cited

U.S. PATENT DOCUMENTS 5,350,646 A     9/1994  Armand et al.
2004/0081891 A1*  4/2004  Yamaguchi ............. H01M 6/22
                                           429/303
(Continued)

FOREIGN PATENT DOCUMENTS

CN    101091283 A    12/2007
CN    101197437 A     6/2008
(Continued)

OTHER PUBLICATIONS

International Search Report dated Apr. 25, 2018.
(Continued)

*Primary Examiner* — Sadie White
(74) *Attorney, Agent, or Firm* — Lee IP Law, P.C.

(57) ABSTRACT

Disclosed are an electrolyte for lithium secondary battery, and a lithium secondary battery comprising same, the electrolyte comprising: a non-aqueous organic solvent; lithium salt; and an additive represented by Chemical Formula 1.

11 Claims, 8 Drawing Sheets

(51) Int. Cl.
  *H01M 4/525* (2010.01)
  *H01M 10/0525* (2010.01)
  *H01M 10/0569* (2010.01)
  *H01M 4/02* (2006.01)

(52) U.S. Cl.
  CPC ... *H01M 10/0525* (2013.01); *H01M 10/0569* (2013.01); *H01M 2004/027* (2013.01); *H01M 2004/028* (2013.01)

(56) References Cited

U.S. PATENT DOCUMENTS

| | | |
|---|---|---|
| 2007/0243471 A1 | 10/2007 | Takahashi |
| 2008/0102377 A1 | 5/2008 | Abe et al. |
| 2008/0138716 A1 | 6/2008 | Iwama et al. |
| 2008/0311478 A1* | 12/2008 | Onuki ............... H01M 10/0567 429/231.95 |
| 2009/0155697 A1 | 6/2009 | Park et al. |
| 2009/0226820 A1* | 9/2009 | Jeon ................ H01M 10/0569 429/334 |
| 2012/0244445 A1 | 9/2012 | Han et al. |
| 2013/0157124 A1 | 6/2013 | Hagiyama et al. |
| 2014/0272604 A1* | 9/2014 | Lim ................ H01M 10/0525 429/331 |
| 2015/0010810 A1 | 1/2015 | Cho et al. |
| 2016/0359197 A1 | 12/2016 | Watarai et al. |
| 2017/0084951 A1 | 3/2017 | Dubois et al. |
| 2019/0058221 A1* | 2/2019 | Burkhardt ......... H01M 10/0567 |

FOREIGN PATENT DOCUMENTS

| | | |
|---|---|---|
| CN | 103098289 A | 5/2013 |
| CN | 104282943 A | 1/2015 |
| JP | 01-320767 A | 12/1989 |
| JP | H0766819 | * 12/1989 |
| JP | 05-082168 A | 4/1993 |
| JP | H 0766819 B2 | 7/1995 |
| JP | 2003-86244 | 3/2003 |
| KR | 10-2005-0034118 | 4/2005 |
| KR | 10-2006-0063035 | 6/2006 |
| KR | 10-2006-0088950 | 8/2006 |
| KR | 10-2007-0103296 | 10/2007 |
| KR | 10-1211127 | 12/2012 |
| KR | 10-1309156 | 9/2013 |
| WO | WO 2015/179205 A1 | 11/2015 |

OTHER PUBLICATIONS

Chinese Office action and Search Report dated Nov. 2, 2021.
Zuo Fei-long, et al., "Investigation of low temperature organic electrolytes for supercapacitors", Chinese Journal of Power Sources, Oct. 2016 vol.40 No.10.
Chinese Notice of Allowance and Search Report dated May 11, 2022.

* cited by examiner

ELECTROLYTE FOR LITHIUM SECONDARY BATTERY, AND LITHIUM SECONDARY BATTERY COMPRISING SAME

CROSS REFERENCE TO RELATED APPLICATIONS

This is the U.S. national phase application based on PCT Application No. PCT/KR2018/000769, filed Jan. 17, 2018, which is based on Korean Application No. 10-2017-0055621, filed Apr. 28, 2017, the entire contents of all of which are hereby incorporated by reference.

TECHNICAL FIELD

An electrolyte for a lithium secondary battery and a lithium secondary battery including the same are related.

BACKGROUND ART

Lithium secondary batteries are attracting attention as power sources for various electronic devices because of high discharge voltage and high energy density.

As for positive active materials of lithium secondary batteries, a lithium-transition metal oxide having a structure capable of intercalating lithium ions such as $LiCoO_2$, $LiMn_2O_4$, $LiNi_{1-x}Co_xO_2$ (0<x<1), and the like has been used.

As for negative active materials of lithium secondary batteries, various carbon-based materials such as artificial graphite, natural graphite, and hard carbon capable of intercalating and deintercalating lithium ions have been used.

As for electrolytes of lithium secondary batteries, an organic solvent in which a lithium salt is dissolved has been used.

The lithium secondary batteries have a high temperature problem, that is, gas generation and electrode resistance due to the reaction between the positive active material and the electrolyte, which are significantly increased at particularly high temperature, and in addition, the solid electrolyte interface (SEI) film formed on the negative active material surface is destroyed at high temperature, and by-products are continuously generated to accelerate an irreversible reaction of the battery, and this phenomenon causes problems with battery performance degradation and thickness expansion (swelling) due to gas at higher temperatures than room temperature.

DISCLOSURE

Technical Problem

An embodiment provides an electrolyte for a lithium secondary battery that may prevent problems of thickness expansion at high temperatures.

Another embodiment provides a lithium secondary battery including the electrolyte.

Technical Solution

According to an embodiment, an electrolyte for a lithium secondary battery includes a non-aqueous organic solvent; a lithium salt; and an additive represented by Chemical Formula 1.

[Chemical Formula 1]

In Chemical Formula 1,
$R_a$, $R_b$, $R_c$, and $R_d$ are each independently a halogen, a substituted or unsubstituted alkyl group, or $C_nF_{2n+1}$ (n is an integer of 1 to 5). The $R_a$, $R_b$, $R_c$, and $R_d$ may each independently be a substituted or unsubstituted alkyl group. Herein, the alkyl group may have a carbon number of 1 to 5.

An amount of the additive may be 0.1 wt % to 2 wt % based on a total weight of the electrolyte and may be 0.5 wt % to 2 wt % based on a total weight of the electrolyte.

Another embodiment of the present invention provides a lithium secondary battery including a negative electrode including a negative active material; a positive electrode including a positive active material; and the electrolyte.

Other embodiments are included in the following detailed description.

Advantageous Effects

An electrolyte for a lithium secondary battery according to an embodiment of the present invention may improve storage characteristics at a high temperature, particularly high temperature swelling characteristics.

MODE FOR INVENTION

Hereinafter, embodiments of the present invention are described in detail. However, these embodiments are exemplary, the present invention is not limited thereto and the present invention is defined by the scope of claims.

An embodiment of the present invention provides an electrolyte for a lithium secondary battery including a non-aqueous organic solvent; a lithium salt; and an additive represented by Chemical Formula 1.

[Chemical Formula 1]

In Chemical Formula 1, $R_a$, $R_b$, $R_c$, and $R_d$ may independently be a halogen, a substituted or unsubstituted alkyl group, or $C_nF_{2n+1}$ (n is an integer of 1 to 5. In addition, in Chemical Formula 1, $R_a$, $R_b$, $R_c$, and $R_d$ may independently be a substituted or unsubstituted alkyl group. Herein, the carbon number of the alkyl group may be 1 to 5. If the carbon number increases further, a resistance may increase. The alkyl group may be linear or branched.

The halogen may be F, Cl, Br, or I.

The substituted alkyl group may be an alkyl group in which at least one hydrogen is substituted with an alkyl group, a halogen, an aromatic group, an amine group, an amide, or a nitrile group. The substituted alkyl group means a linear, branched, or cyclic alkyl group, wherein the carbon number is 1 to 5. The aromatic group means an aromatic group having the carbon number of 4 to 6. Examples of the aromatic group may be benzene, pyran, hydropyran, furan, or hydrofuran. The halogen means F, Cl, Br, or I.

In Chemical Formula 1, when $R_a$, $R_b$, $R_c$, and $R_d$ are all hydrogen, reductive decomposition reactivity is increased, thereby, a film is excessively accumulated on the surface of a negative active material, and resultantly, cycle-life characteristics are inappropriately deteriorated.

As shown in Chemical Formula 1, as for a 5-membered ring having a —(O)C—O—$CR_aR_b$—C(O)— structure, that is, having a $CR_aR_b$ group between O and C(O) functional groups, very excellent storage characteristics at a high temperature, particularly, swelling improvement effects at a high temperature may be obtained. When the O and C(O) functional groups are directly linked each other like —(O)C—O—C(O)—, for example, as in Chemical Formula 6, a bond between the O and C(O) functional groups may be easily broken, and resultantly, a SEI film, a protective layer formed on the surface of a negative electrode during the battery charge and discharge, may be formed to be excessively thick, and in addition, cycle-life characteristics may be sharply deteriorated.

[Chemical Formula 6]

An amount of the additive may be 0.1 wt % to 2 wt % based on a total weight of the electrolyte, and according to another embodiment, it may be 0.5 wt % to 2 wt % based on a total weight of the electrolyte. When the amount of the additive is within the ranges, storage characteristics at a high temperature may be improved.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, dimethylacetate, methylpropionate, ethylpropionate, propylpropionate, v-butyrolactone, decanolide, valerolactone, mevalonolactone, caprolactone, and the like.

The ether-based solvent may include dibutyl ether, tetraglyme, diglyme, dimethoxyethane, 2-methyltetrahydrofuran, tetrahydrofuran, and the like and the ketone-based solvent may include cyclohexanone, and the like.

The alcohol-based solvent may include ethanol, isopropyl alcohol, and the like and the aprotic solvent may include nitriles such as T-CN (wherein T is a hydrocarbon group having a C2 to C20 linear, branched, or cyclic structure and may include a double bond, an aromatic ring, or an ether bond), and the like, dioxolanes such as 1,3-dioxolane, and the like, sulfolanes, and the like.

The non-aqueous organic solvent may be used alone or in a mixture. When the organic solvent is used in a mixture, the mixture ratio may be controlled in accordance with a desirable battery performance, which may be widely understood by those skilled in the art.

The carbonate-based solvent is prepared by mixing a cyclic carbonate and a linear carbonate. When the cyclic carbonate and linear carbonate are mixed together in a volume ratio of 1:1 to 1:9, a performance of an electrolyte may be improved.

The non-aqueous organic solvent may further include an aromatic hydrocarbon-based organic solvent in addition to the carbonate-based solvent. Herein, the carbonate-based solvent and the aromatic hydrocarbon-based organic solvent may be mixed in a volume ratio of 1:1 to 30:1.

The aromatic hydrocarbon-based organic solvent may be an aromatic hydrocarbon-based compound of Chemical Formula 2.

[Chemical Formula 2]

In Chemical Formula 2, $R_1$ to $R_6$ are the same or different and are selected from hydrogen, a halogen, a C1 to C10 alkyl group, a haloalkyl group, and a combination thereof.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte of a lithium secondary battery may further include an ethylene carbonate-based compound represented by Chemical Formula 3.

[Chemical Formula 3]

In Chemical Formula 3, $R_7$ and $R_8$ are independently hydrogen, a halogen, a cyano group (CN), a nitro group ($NO_2$), and a fluorinated C1 to C5 alkyl group, provided that at least one of $R_7$ and $R_8$ is selected from a halogen, a cyano group (CN), a nitro group ($NO_2$), and a fluorinated C1 to C5 alkyl group, and $R_7$ and $R_8$ are not simultaneously hydrogen.

Examples of the ethylene carbonate-based compound may be difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. When such an additive for improving cycle life is further used, the amount may be controlled within an appropriate range.

The lithium salt dissolved in an organic solvent supplies lithium ions in a battery, enables a basic operation of a lithium secondary battery, and improves transportation of the lithium ions between positive and negative electrodes. Examples of the lithium salt include at least one supporting salt selected from $LiPF_6$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers, for example, an integer ranging from 1 to 20), LiCl, LiI, and $LiB(C_2O_4)_2$ (lithium bis(oxalato) borate; LiBOB). The lithium salt may be used in a concentration ranging from 0.1 M to 2.0 M. When the lithium salt is included at the above concentration range, an electrolyte may have excellent performance and lithium ion mobility due to optimal electrolyte conductivity and viscosity.

Another embodiment provides a lithium secondary battery including the electrolyte, a positive electrode, and a negative electrode.

The positive electrode includes a current collector and a positive active material layer disposed on the current collector and including a positive active material.

In the positive active material layer, the positive active material may include a compound (lithiated intercalation compound) capable of intercalating and deintercallating lithium and specifically at least one composite oxide of lithium and a metal of cobalt, manganese, nickel, and a combination thereof may be used. Specific examples thereof may be a compound represented by one of chemical formulae. $Li_aA_{1-b}X_bD_2$ (0.90≤a≤1.8, 0≤b≤0.5); $Li_aA_{1-b}X_bO_{2-c}T_c$ (0.90≤a≤1.8, 0≤b≤0.5, 0≤c≤0.05); $Li_aE_{1-b}X_bO_{2-c}T_c$ (0.90≤a≤1.8, 0≤b≤0.5, 0≤c≤0.05); $Li_aE_{2-b}X_bO_{4-c}T_c$ (0.90≤a≤1.8, 0≤b≤0.5, 0≤c≤0.05); $Li_aNi_{1-b-c}Co_bX_cD_\alpha$ (0.90≤a≤1.8, 0≤b≤0.5, 0≤c≤0.5, 0<α≤2); $Li_aNi_{1-b-c}Co_bX_cO_{2-\alpha}T_a$ (0.90≤a≤1.8, 0≤b≤0.5, 0≤c≤0.05, 0<α<2); $Li_aNi_{1-b-c}Co_bX_cO_{2-\alpha}T_2$ (0.90≤a≤1.8, 0≤b≤0.5, 0≤c≤0.05, 0<α<2); $Li_aNi_{1-b-c}Mn_bX_cD_\alpha$ (0.90≤a≤1.8, 0≤b≤0.5, 0≤c≤0.05, 0<α≤2); $Li_aNi_{1-b-c}Mn_bX_cO_{2-\alpha}T_a$ (0.90≤a≤1.8, 0≤b≤0.5, 0≤c≤0.05, 0<α<2); $Li_aNi_{1-b-c}Mn_bX_cO_{2-\alpha}T_a$ (0.90≤a≤1.8, 0≤b≤0.5, 0≤c≤0.05, 0<α<2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1) $Li_aCoG_bO_2$ (0.90≤a≤1.8, 0.001≤b≤0.1); $Li_aMn_{1-b}G_bO_2$ (0.90≤a≤1.8, 0.001≤b≤0.1); $Li_aMn_2G_bO_4$ (0.90≤a≤1.8, 0.001≤b≤0.1); $Li_aMn_{1-g}G_gPO_4$ (0.90≤a≤1.8, 0≤g≤0.5); $QO_2$, $QS_2$, $LiQS_2$, $V_2O_5$, $LiV_2O_5$, $LiZO_2$, $LiNiVO_4$, $Li_{(3-f)}J_2(PO_4)_3$ (0≤f≤2); $Li_{(3-f)}Fe_2(PO_4)_3$ (0≤f≤2); $Li_aFePO_4$ (0.90≤a≤1.8)

In chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

For the positive active material, $Li_aA_{1-b}X_bD_2$ (0.90≤a≤1.8, 0≤b≤0.5, A is Co) or $Li_aA_{1-b}X_bO_{2-c}T_c$ (0.90≤a≤1.8, 0≤b≤0.5, 0≤c≤0.05, A is Co) may be used more appropriately. In the case that the cobalt compound wherein A is cobalt is used as a positive active material, when used with the electrolyte according to an embodiment, storage characteristics at a high temperature may be more maximized.

The compound may have a coating layer on the surface, or may be mixed with another compound having a coating layer. The coating layer may include at least one coating element compound selected from an oxide of a coating element, a hydroxide of a coating element, an oxyhydroxide of a coating element, an oxycarbonate of a coating element, and a hydroxy carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed by a method having no adverse influence on properties of a positive active material by using these elements in the compound and for example, the method may include any coating method (e.g., spray coating, dipping, etc.), but is not illustrated in more detail since it is well-known to those skilled in the related field.

In the positive electrode, the positive active material may be included in an amount of 90 wt % to 98 wt % based on a total weight of the positive active material layer.

In an embodiment, the positive active material layer may further include a binder and a conductive material. Herein, the binder and the conductive material may be included in an amount of 1 wt % to 5 wt %, respectively based on the total amount of the positive active material layer.

The binder improves binding properties of positive active material particles with one another and with a current collector, and examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but is not limited thereto.

The conductive material is included to provide electrode conductivity and any electrically conductive material may be used as a conductive material unless it causes a chemical change. Examples of the conductive material may include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may be an aluminum foil, a nickel foil, or a combination thereof, but is not limited thereto.

The negative electrode includes a current collector and a negative active material layer disposed on the current collector and including a negative active material.

The negative active material may include a material that reversibly intercalates/deintercalates lithium ions, a lithium metal, a lithium metal alloy, a material capable of doping/dedoping lithium, or transition metal oxide.

The material that reversibly intercalates/deintercalates lithium ions may include a carbon material, that is, a generally-used carbon-based negative active material in a lithium secondary battery. Examples of the carbon-based negative active material may include crystalline carbon, amorphous carbon, or mixtures thereof. The crystalline carbon may be non-shaped, or sheet, flake, spherical, or fiber shaped natural graphite or artificial graphite, and the amorphous carbon may be a soft carbon, a hard carbon, a mesophase pitch carbonization product, fired coke, and the like.

The lithium metal alloy includes an alloy of lithium and a metal selected from Na, K, Rb, Cs, Fr, Be, Mg, Ca, Sr, Si, Sb, Pb, In, Zn, Ba, Ra, Ge, Al, and Sn.

The material capable of doping/dedoping lithium may be Si, $SiO_x$ ($0<x<2$), a Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, and not Si), a Si-carbon composite, Sn, $SnO_2$, a Sn—R alloy (wherein R is an element selected from an alkali metal, an alkaline-earth metal, a Group 13 element, a Group 14 element, a Group 15 element, a Group 16 element, a transition metal, a rare earth element, and a combination thereof, and not Sn), a Sn-carbon composite, and the like and at least one of these materials may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and a combination thereof.

The transition metal oxide includes a lithium titanium oxide.

The negative active material layer includes a negative active material and a binder, and optionally a conductive material.

In the negative active material layer, the negative active material may be included in an amount of 95 wt % to 99 wt % based on a total weight of the negative active material layer. In the negative active material layer, an amount of the binder may be 1 wt % to 5 wt % based on a total weight of the negative active material layer. When the negative active material layer includes a conductive material, the negative active material layer includes 90 wt % to 98 wt % of the negative active material, 1 wt % to 5 wt % of the binder, and 1 wt % to 5 wt % of the conductive material.

The binder improves binding properties of negative active material particles with one another and with a current collector. The binder includes a non-water-soluble binder, a water-soluble binder, or a combination thereof.

The non-water-soluble binder may be selected from polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may be a styrene-butadiene rubber, an acrylated styrene-butadiene rubber, polyvinyl alcohol, sodium polyacrylate, a copolymer of propylene and C2 to C8 olefin, a copolymer of (meth)acrylic acid and (meth)acrylic acid alkyl ester, or a combination thereof.

When the water-soluble binder is used as a negative electrode binder, a cellulose-based compound may be further used to provide viscosity as a thickener. The cellulose-based compound includes one or more of carboxymethyl cellulose, hydroxypropylmethyl cellulose, methyl cellulose, or alkali metal salts thereof. The alkali metals may be Na, K, or Li. The thickener may be included in an amount of 0.1 parts by weight to 3 parts by weight based on 100 parts by weight of the negative active material.

The conductive material is included to provide electrode conductivity and any electrically conductive material may be used as a conductive material unless it causes a chemical change. Examples of the conductive material include a carbon-based material such as natural graphite, artificial graphite, carbon black, acetylene black, ketjen black, denka black, a carbon fiber, and the like; a metal-based material of a metal powder or a metal fiber including copper, nickel, aluminum silver, and the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof.

The positive active material layer and the negative active material layer are formed by mixing an active material, a binder and optionally a conductive material in a solvent to prepare an active material composition, and coating the active material composition on a current collector. The formation method of the active material is well known in this art, and thus is not described in detail in the detailed description of the present specification. The solvent includes N-methylpyrrolidone and the like, but is not limited thereto. When a water-soluble binder is used in the negative active material layer, a solvent used for preparing the negative active material composition may be water.

In addition, a separator may be disposed between the positive electrode and the negative electrode depending on a type of the lithium secondary battery. Such a separator may include polyethylene, polypropylene, polyvinylidene fluoride, and multi-layers thereof such as a polyethylene/polypropylene double-layered separator, a polyethylene/polypropylene/polyethylene triple-layered separator, or a polypropylene/polyethylene/polypropylene triple-layered separator.

Figure 1:
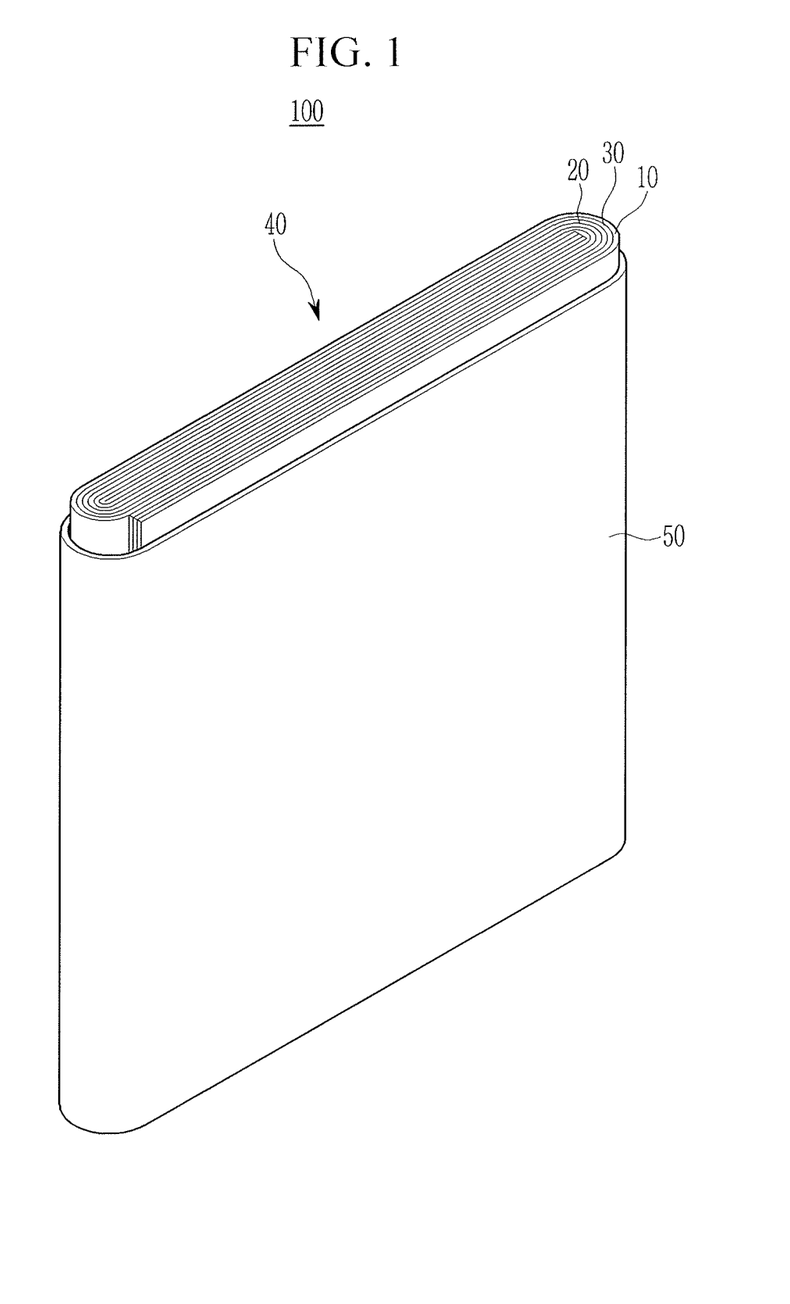
FIG. 1 is a schematic view of a lithium secondary battery according to an embodiment of the present invention.

FIG. 1 is an exploded perspective view of a lithium secondary battery according to an embodiment. The lithium secondary battery according to an embodiment is illustrated as a prismatic battery but is not limited thereto and may include variously-shaped batteries such as a cylindrical battery, a pouch-type battery, and the like.

Referring to FIG. 1, a lithium secondary battery 100 according to an embodiment includes an electrode assembly 40 manufactured by winding a separator 30 disposed between a positive electrode 10 and a negative electrode 20, and a case 50 housing the electrode assembly 40. The positive electrode 10, the negative electrode 20, and the separator 30 may be impregnated with an electrolyte (not shown).

EXAMPLES

Hereinafter, examples of the present invention and comparative examples are described. These examples, however, are not in any sense to be interpreted as limiting the scope of the invention.

(Preparation Example 1) Preparation of Chemical Formula 1a

[Reaction Scheme 1]

The following experiments were all conducted under an air atmosphere.

12.5 mL of dichloromethane and 12.5 mL of acetic anhydride were put in a 100 mL two-necked round flask equipped with a reflux cooler. These compounds were stirred with a magnetic bar, while cooled down by ice. A 30 wt % hydrogen peroxide aqueous solution (14 mL, 0.11 mmol) was slowly added to the round flask over 10 minutes. Subsequently, maleic anhydride (11 g, 0.11 mol) was for once added thereto and then, stirred for one hour.

A stirred product therefrom was heated for one hour and then, reacted, while refluxed. When the reaction was complete, the flask was heated in an ice bath to obtain a compound of Chemical Formula b.

[Chemical Formula b]

1,3-cyclobutanedione,2,2,4,4-tetramethyl (6.0 g, 43 mmol) was added to the solution including the compound of Chemical Formula b. An addition product therefrom was stirred at room temperature for 24 hours for a reaction. When the reaction was complete, a reaction product was washed by a 10 wt % sodium sulfite aqueous solution, a 10 wt % sodium hydroxide aqueous solution, and water.

The washed product was dried with sodium sulfite and filtered to recover a filtrate. A product obtained by removing all the solvents from the filtrate was purified through column chromatography to recover a pure compound represented by Chemical Formula 1a (1.7 g, 11 mmol, yield: 26%)

[Chemical Formula 1a]

$^1$H NMR and $^{13}$C NMR measurement results of the compound of Chemical Formula 1a are shown as follows. In the following experiment result, the $^1$H-NMR and $^{13}$C NMR results were obtained by using a Varian NMR system (Varian, Inc., 400 MHz, CDCl$_3$). In addition, the $^1$H NMR measurement result was shown in FIG. 2, and the $^{13}$C NMR measurement result was shown in FIG. 3.

$^1$H NMR (400 MHz, CDCl$_3$) δ 1.50 (s, 6H), 1.33 (s, 6H);

$^{13}$C NMR (400 MHz, CDCl$_3$) δ 214.98, 176.90, 87.17, 43.42, 24.41, 21.95

Cyclic Voltammetry (CV) Characteristics Evaluation

An additive solution was prepared by adding 1 wt % of 3,3,5,5-tetramethyltetrahydrofuran-2,4-dione represented by Chemical Formula 1a according to Preparation Example 1 to a mixed solvent of ethylene carbonate, ethylmethyl carbonate, and dimethyl carbonate (in a volume ratio of 2:4:4) in which 1.15 M LiPF$_6$ was dissolved.

Figure 2:
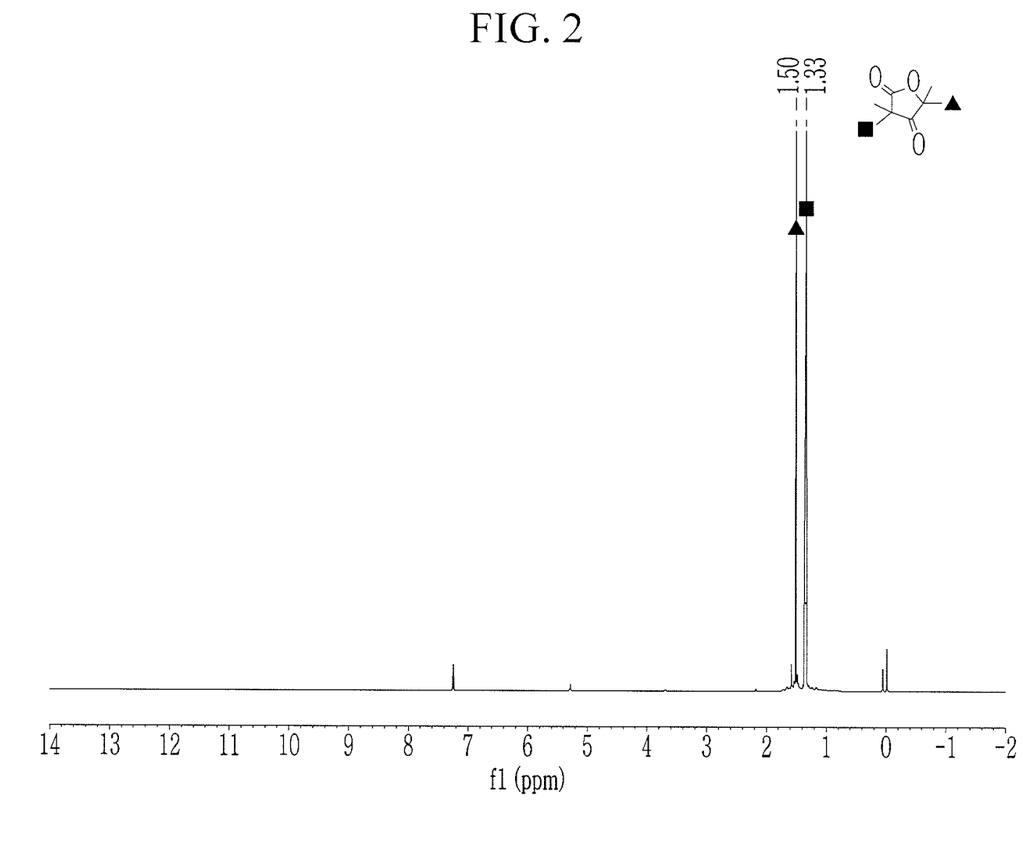
FIG. 2 is a graph showing $^1H$ NMR measurement results of the additive prepared in Preparation Example 1.

Cyclic voltammetry of a tri-electrode using the additive solution, a graphite working electrode, and a lithium counter electrode (a Li counter electrode) (a scan rate: 1 mV/sec) was measured, and the result is shown in FIG. 2.

In FIG. 2, a cycle X indicates the number of X times cycles. As shown in FIG. 2, the additive solution including the additive prepared according to Preparation Example 1 exhibited a decomposition peak, that is, a reduction peak around 1 V, and generally, since a reaction was caused at a higher potential than that of ethylene carbonate showing a reduction peak at 0.5 V, this result exhibited that the additive solution was reduced faster than the ethylene carbonate.

Example 1

An electrolyte for lithium secondary battery was prepared by adding 1.15 M LiPF$_6$ to a mixed solvent of ethylene carbonate, ethylmethyl carbonate, and dimethyl carbonate (in a volume ratio of 2:4:4) and then, 0.5 wt % of the additive represented by Chemical Formula 1a based on 100 wt % of this mixture.

Example 2

An electrolyte for lithium secondary battery was prepared according to the same method as Example 1 except that the amount of the additive represented by Chemical Formula 1a was changed into 0.25 wt %.

Example 3

An electrolyte for lithium secondary battery was prepared according to the same method as Example 1 except that the amount of the additive represented by Chemical Formula 1a was changed into 1.0 wt %.

Example 4

An electrolyte for lithium secondary battery was prepared according to the same method as Example 1 except that the amount of the additive represented by Chemical Formula 1a was changed into 1.5 wt %.

Example 5

An electrolyte for lithium secondary battery was prepared according to the same method as Example 1 except that the amount of the additive represented by Chemical Formula 1a was changed into 2.0 wt %.

Comparative Example 1

An electrolyte for lithium secondary battery was prepared by adding 1.15 M $LiPF_6$ to a mixed solvent of ethylene carbonate, ethylmethyl carbonate, and dimethyl carbonate (in a volume ratio of 2:4:4).

Comparative Example 2

An electrolyte for lithium secondary battery was prepared by adding 1.15 M $LiPF_6$ to a mixed solvent of ethylene carbonate, ethylmethyl carbonate, and dimethyl carbonate (in a volume ratio of 2:4:4) and then, 1.0 wt % of an additive represented by Chemical Formula 5 based on 100 wt % of this mixture.

[Chemical Formula 5]

Comparative Example 3

An electrolyte for lithium secondary battery was prepared by adding 1.15 M $LiPF_6$ to a mixed solvent of ethylene carbonate, ethylmethyl carbonate, and dimethyl carbonate (in a volume ratio of 2:4:4) and then, 1.0 wt % of an additive represented by Chemical Formula 6 based on 100 wt % of this mixture.

[Chemical Formula 6]

Reference Example 1

An electrolyte for lithium secondary battery was prepared according to the same method as Example 1 except that the amount of the additive represented by Chemical Formula 1a was changed into 2.5 wt %.

Reference Example 2

An electrolyte for lithium secondary battery was prepared according to the same method as Example 1 except that the amount of the additive represented by Chemical Formula 1a was changed into 0.25 wt %.

Manufacture of Battery Cell

Positive active material slurry was prepared by mixing 96 wt % of a $LiCoO_2$ positive active material, 2 wt % of a ketjen black conductive material, and 2 wt % of polyvinylidene fluoride in an N-methylpyrrolidone solvent. The positive active material slurry was coated on an aluminum foil and then, dried and compressed to manufacture a positive electrode.

Negative active material slurry was prepared by mixing 96 wt % of a graphite negative active material, 2 wt % of a ketjen black conductive material, and 2 wt % of polyvinylidene fluoride in an N-methylpyrrolidone solvent. The negative active material slurry was coated on a copper foil and then, dried and compressed to manufacture a negative electrode.

The positive electrode, the negative electrode, and each electrolyte according to Example 1 to 5, Comparative Example 1 to 3, and Reference Examples 1 and 2 were used to respectively manufacture lithium secondary battery cells in a common method. Herein, the electrolyte was injected in an amount of 5.8 g.

Thickness Increase Rate

The lithium secondary battery cells respectively using the electrolytes of Example 1, Comparative Example 1, and Reference Example 2 were charged to 4.4 V at 0.5 C with 100% of SOC (state of charge) (a full charge, a battery cell was charged to have 100% of charge capacity based on 100% of the entire charge capacity of the battery cell during the charge and discharge from 2.75 V to 4.4 V and then, stored at 60° C. for 35 days. Before and after the storage, each battery thickness was measured, and the results are shown in Table 1. In addition, the results were used to calculate a battery thickness increase rate, and the results are shown in Table 1.

TABLE 1

| | Thickness while stored at 60° C. (mm) | | Thickness increase |
|---|---|---|---|
| | Initial | After 35 days | rate (%) |
| Comparative Example 1 | 4.90 | 6.08 | 24.1 |
| Example 1 | 4.89 | 4.99 | 2.0 |
| Reference Example 2 | 4.89 | 5.88 | 20.2 |

As shown in Table 1, Example 1 exhibited a thickness increase rate of 2.0% which is greatly higher than 24.1% of that of Comparative Example 1. In other words, Example 1 exhibited very improved storage characteristics at a high temperature compared with Comparative Example 1. In addition, a thickness increase rate of Reference Example 2 was 20.2%, which was similar to that of Comparative Example 1, and accordingly, when the additive represented by Chemical Formula 1a was used in a very small amount of 0.25 wt %, which is less than 0.5 wt %, an effect of suppressing storage characteristics at a high temperature was insignificant, and thus an improvement effect was difficult to obtain.

In addition, the lithium secondary battery cells respectively using the electrolytes according to Examples 3 and 4 and Comparative Example 1 were charged to 4.45 V at 0.5 C with 100% of SOC (state of charge) (a full charge, a battery cell was charged from 2.75 V to 4.45 V to have charge capacity of 100% based on 100% of the entire charge capacity of the battery cell during the charge and discharge) and then, stored at 60° C. for 28 days. Before and after the storage, each battery thickness was measured, and the results are shown in Table 2. In addition, these results are used to calculate a battery thickness increase rate, and the results are shown in Table 2.

TABLE 2

|  | Thickness while stored at 60° C. (mm) | | Thickness increase rate (%) |
| --- | --- | --- | --- |
|  | Initial | After 28 days |  |
| Comparative Example 1 | 4.95 | 5.65 | 14.1 |
| Example 3 | 4.96 | 5.52 | 11.3 |
| Example 4 | 4.94 | 5.29 | 7.1 |

As shown in Table 2, Example 3 exhibited a thickness increase rate of 11.3%, that of Example 4 was 7.1%, but that of Comparative Example 1 was 14.1%, which is greatly high. In other words, Examples 3 and 4 exhibited improved storage characteristics at a high temperature compared with that of Comparative Example 1, and particularly, Example 4 exhibited the most improved storage characteristics at a high temperature.

Impedance (Electrochemical Impedance Spectroscopy: EIS) Measurement

Figure 3:
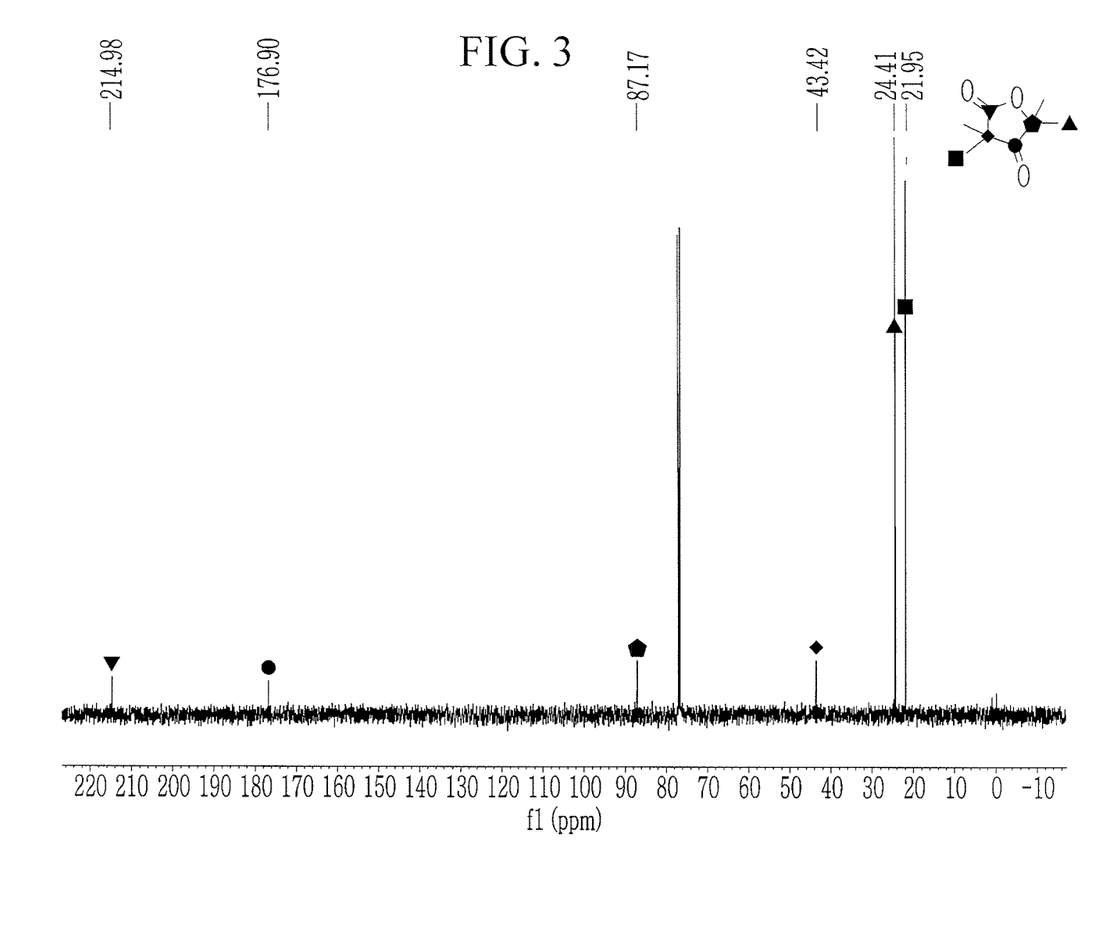
FIG. 3 is a graph showing $^{13}C$ NMR measurement results of the additive prepared in Preparation Example 1.
Figure 4:
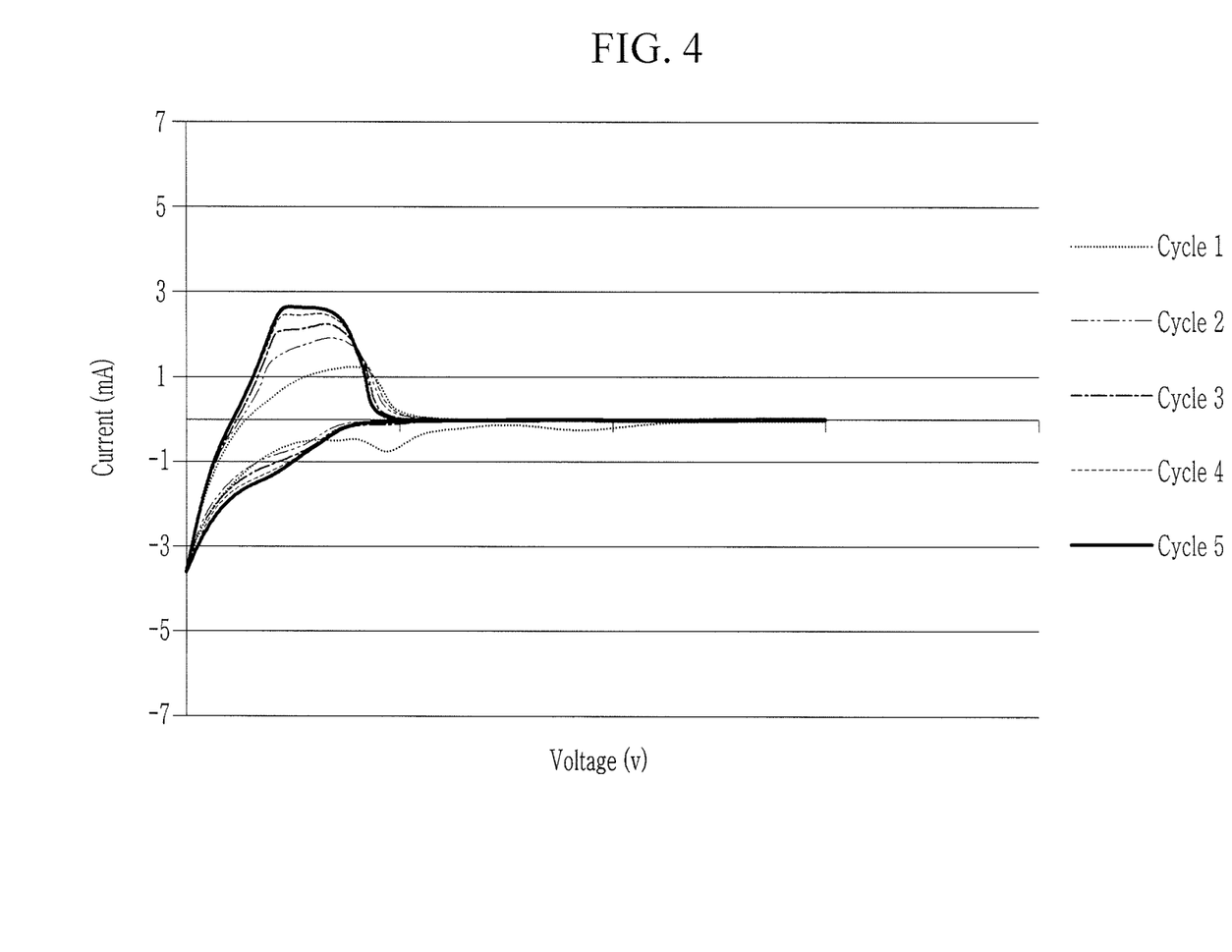
FIG. 4 is a graph showing cyclic voltammetry (CV) results of the additive solution including the additive prepared in Preparation Example 1.

The lithium secondary battery cells respectively using the electrolytes of Example 1 and Comparative Example 1 were charged to 4.4 V at 0.5 C with 100% of SOC (state of charge) (a full charge, a battery cell was charged to have 100% of charge capacity based on 100% of the entire charge capacity of the battery cell during the charge and discharge from 2.75 V to 4.4 V) and then, stored at 60° C. for 35 days, and then, impedance of the cells before and after the storage was measured, and the results are respectively shown in FIGS. 3 and 4.

As shown in FIG. 3, before the storage at a high temperature, Example 1 and Comparative Example 1 exhibited almost no difference in terms of impedance, that is, charge transfer resistance, but as shown in FIG. 4, after the storage at a high temperature, Example 1 exhibited greatly lower impedance than that of Comparative Example 1.

Evaluation of High Temperature Cycle-Life Characteristics

Battery cells respectively using the electrolytes according to Example 3 and Comparative Examples 2 and 3 were 150 times charged and discharged under a 1 C charge/1 C discharge condition, and discharge capacity thereof was measured. The measured discharge capacity was used according to the following equation to obtain capacity retention, and the results are shown in Table 3 and FIG. 5.

Figure 5:
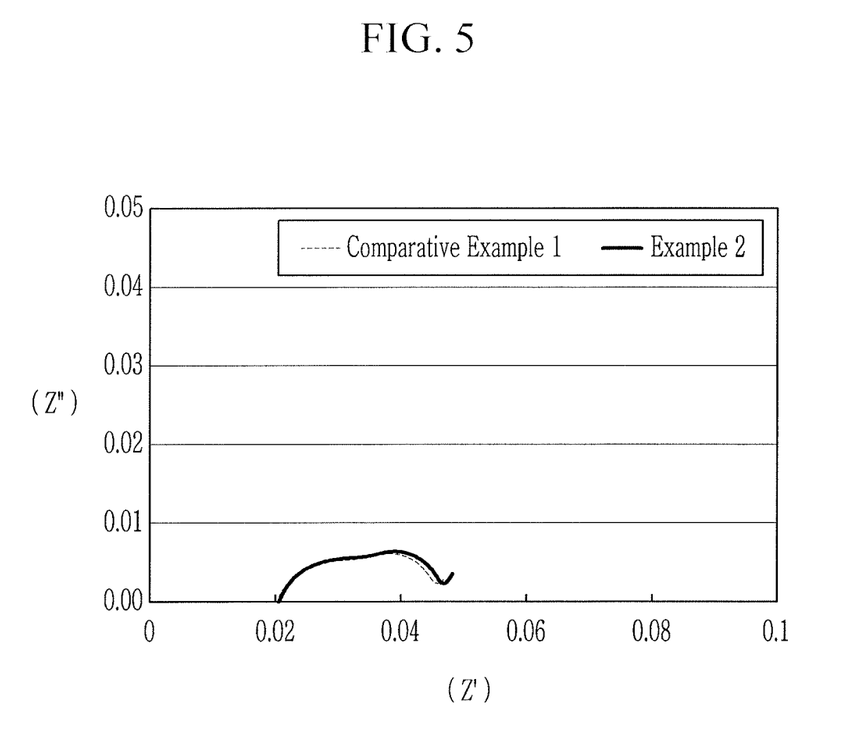
FIG. 5 is a graph showing EIS measurements before storing lithium secondary battery cells manufactured using the electrolytes prepared according to Example 1 and Comparative Example 1.

Capacity retention (%) at the $n^{th}$ cycle=[discharge capacity at $n^{th}$ cycle/discharge capacity at the $1^{st}$ cycle]×100 [Equation 1]

TABLE 3

|  | $150^{th}$ capacity retention (%) |
| --- | --- |
| Example 3 | 80.9 |
| Comparative Example 2 | 60.1 |
| Comparative Example 3 | 21.9 |

As shown in Table 3 and FIG. 5, the lithium secondary battery cell using the electrolyte of Example 3 exhibited excellent capacity retention compared with those of Comparative Examples 2 and 3. Referring to this result, when the compound of Chemical Formula 5 having hydrogen at $R_a$, $R_b$, $R_c$, and $R_d$ in Chemical Formula 1 (Comparative Example 2) or the compound of Chemical Formula 6 having —(O)C—O—C(O)—(Comparative Example 3) was included, capacity retention was greatly deteriorated, which clearly shows the compounds are not appropriate.

The battery cells respectively using the electrolytes of Example 5 and Reference Examples 1 and 3 were 150 times charged and discharged under a 1 C charge/1 C discharge condition, and then, discharge capacity thereof was measured. The measured discharge capacity was used to obtain capacity retention according to the formula 1, and the results are shown in Table 3 and FIG. 6. In addition, the capacity retention result of Example 3 is shown in Table 4 and FIG. 6.

TABLE 4

|  | Capacity retention for 150 cycles (%) |
| --- | --- |
| Example 3 | 80.9 |
| Example 5 | 79.1 |
| Reference Example 1 | 67.2 |

Figure 6:
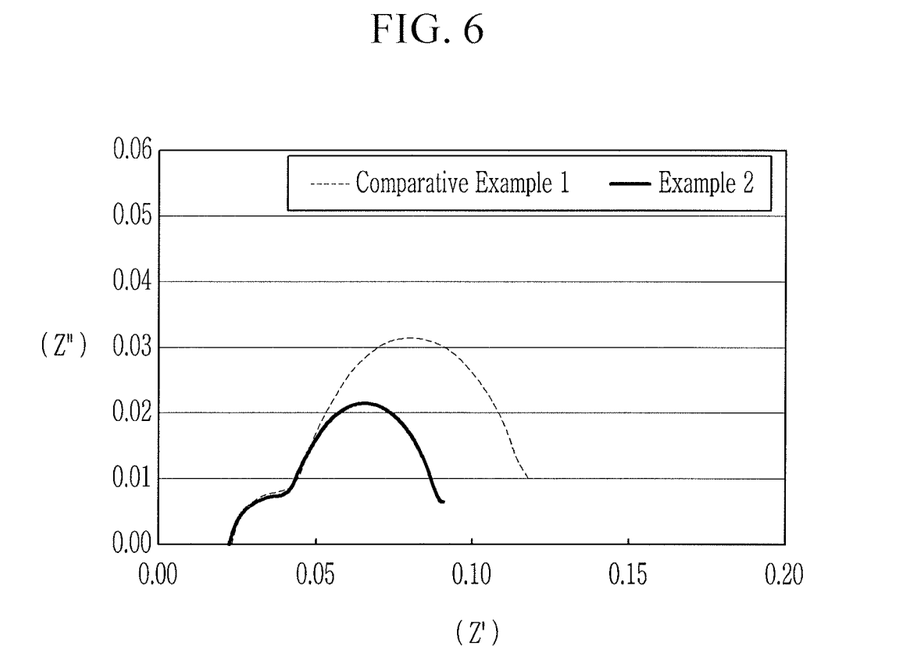
FIG. 6 is a graph showing EIS measurements after storing lithium secondary battery cells manufactured using the electrolytes prepared according to Example 1 and Comparative Example 1.
Figure 7:
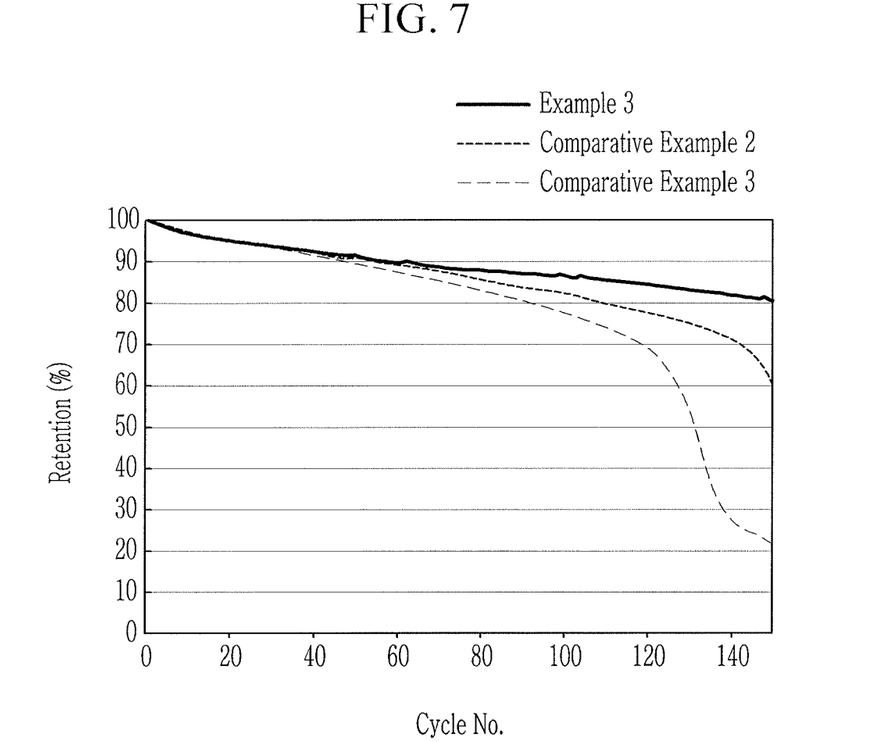
FIG. 7 is a graph showing high temperature cycle-life characteristics of the lithium secondary battery cells including the electrolytes prepared according to Example 3 and Comparative Examples 2 and 3.
Figure 8:
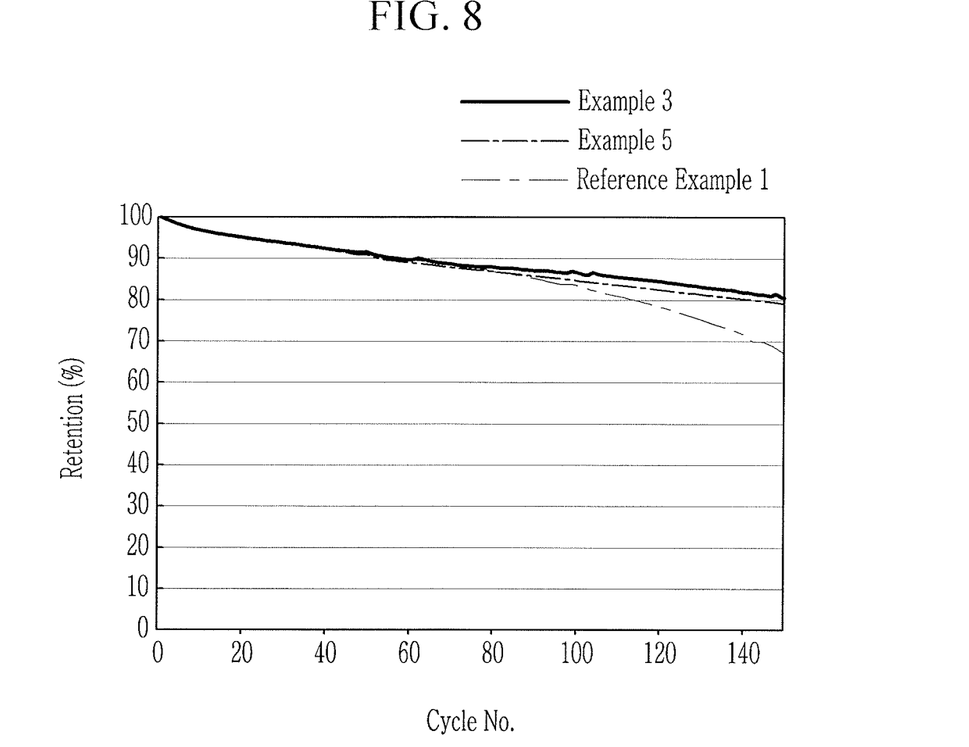
FIG. 8 is a graph showing high temperature cycle-life characteristics of the lithium secondary battery cells including the electrolytes prepared according to Examples 3 and 5 and Reference Example 1.

As shown in Table 4 and FIG. 6, the lithium secondary battery cells respectively using the electrolytes of Examples 3 and 5 exhibited excellent capacity retention compared with that of Reference Example 1. Referring to this results, Reference Example 1 using the compound of Chemical Formula 1a in an excessive amount of 2.5 wt % exhibited deteriorated capacity retention.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

The invention claimed is:

1. An electrolyte for a lithium secondary battery, comprising:
a non-aqueous organic solvent;
a lithium salt; and
an additive represented by Chemical Formula 1:

[Chemical Formula 1]

wherein, in Chemical Formula 1, $R_a$, $R_b$, $R_c$, and $R_d$ are each independently a halogen, a substituted or unsubstituted alkyl group, or $C_nF_{2n+1}$ in which n is an integer of 1 to 5.

2. The electrolyte for a lithium secondary battery of claim 1, wherein an amount of the additive is 0.1 wt % to 2 wt % based on a total weight of the electrolyte.

3. The electrolyte for a lithium secondary battery of claim 1, wherein an amount of the additive is 0.5 wt % to 2 wt % based on a total weight of the electrolyte.

4. The electrolyte for a lithium secondary battery of claim 1, wherein $R_a$, $R_b$, $R_c$, and $R_d$ are each independently a substituted or unsubstituted alkyl group.

5. The electrolyte for a lithium secondary battery of claim 1, wherein $R_a$, $R_b$, $R_c$, and $R_d$ are each independently a substituted or unsubstituted alkyl group in which a carbon number of the alkyl group is 1 to 5.

6. A lithium secondary battery comprising:

a negative electrode including a negative active material;

a positive electrode including a positive active material; and the electrolyte of claim 1.

7. The lithium secondary battery of claim 6, wherein the positive active material includes a compound capable of intercalating and deintercalating lithium.

8. The lithium secondary battery of claim 6, wherein the positive active material is:

$Li_aCo_{1-b}X_bD_2$ in which $0.90 \leq a \leq 1.8$, $0 \leq b \leq 0.5$, X is Al, Ni, Co, Mn, Cr, Fe, Mg, Sr, V, a rare earth element, or a combination thereof, and D is O, F, S, P, or a combination thereof, or $Li_aCo_{1-b}X_bO_{2-c}T_c$ in which $0.90 \leq a \leq 1.8$, $0 \leq b \leq 0.5$, $0 \leq c \leq 0.05$, X is Al, Ni, Co, Mn, Cr, Fe, Mg, Sr, V, a rare earth element, or a combination thereof, and T is F, S, P, or a combination thereof.

9. An electrolyte for a lithium secondary battery, comprising:

a non-aqueous organic solvent;

a lithium salt; and an additive represented by Chemical Formula 1, wherein an amount of the additive is 0.5 wt % to 2 wt % based on a total weight of the electrolyte:

[Chemical Formula 1]

wherein, in Chemical Formula 1, $R_a$, $R_b$, $R_c$, and $R_d$ are each independently a halogen, a substituted or unsubstituted alkyl group, or $C_nF_{2n+1}$ in which n is an integer of 1 to 5.

10. A lithium secondary battery comprising:

a negative electrode including a negative active material;

a positive electrode including a positive active material; and the electrolyte of claim 9.

11. The electrolyte for a lithium secondary battery of claim 1, wherein the additive represented by Chemical Formula 1 is

* * * * *